United States Patent
Piazza et al.

(10) Patent No.: US 11,112,245 B2
(45) Date of Patent: Sep. 7, 2021

(54) ACOUSTO-OPTIC GYROSCOPES

(71) Applicant: CARNEGIE MELLON UNIVERSITY, Pittsburgh, PA (US)

(72) Inventors: Gianluca Piazza, Pittsburgh, PA (US); Mohamed Mahmoud, Pittsburgh, PA (US); Ashraf Mahmoud, Pittsburgh, PA (US); Lutong Cai, Pittsburgh, PA (US); Md Shofiqul Islam Khan, Pittsburgh, PA (US); Tamal Mukherjee, Pittsburgh, PA (US); James Bain, Pittsburgh, PA (US)

(73) Assignee: CARNEGIE MELLON UNIVERSITY, Pittsburgh, PA (US)

(*) Notice: Subject to any disclaimer, the term of this patent is extended or adjusted under 35 U.S.C. 154(b) by 326 days.

(21) Appl. No.: 16/151,010

(22) Filed: Oct. 3, 2018

(65) Prior Publication Data

US 2019/0120624 A1    Apr. 25, 2019

Related U.S. Application Data

(60) Provisional application No. 62/606,676, filed on Oct. 3, 2017.

(51) Int. Cl.
*G01C 19/5698* (2012.01)
*G01H 9/00* (2006.01)
*G10K 11/36* (2006.01)

(52) U.S. Cl.
CPC ......... *G01C 19/5698* (2013.01); *G01H 9/004* (2013.01); *G10K 11/36* (2013.01)

(58) Field of Classification Search
CPC ..... G01C 19/5698; G01H 9/004; G10K 11/36
USPC ...................................................... 73/504.12
See application file for complete search history.

(56) References Cited

U.S. PATENT DOCUMENTS

| | | | | |
|---|---|---|---|---|
| 4,965,479 | A * | 10/1990 | Elliott | H03H 9/02236 310/313 D |
| 5,144,262 | A * | 9/1992 | Hunsinger | H03B 5/326 257/215 |
| 6,031,315 | A * | 2/2000 | Abbott | H03H 9/02551 310/313 A |
| 2008/0028855 | A1* | 2/2008 | Kano | G01C 19/5698 73/504.12 |
| 2009/0133495 | A1* | 5/2009 | Arakawa | G01C 19/5698 73/504.01 |
| 2020/0173780 | A1* | 6/2020 | Wu | G01C 19/5698 |
| 2020/0408800 | A1* | 12/2020 | Lal | G01L 1/165 |

OTHER PUBLICATIONS

Nakamura et al.,"Trapped-Energy Vibratory Gyroscopes Using Rotated Y-cut LiNbO3", Jpn. J. Appl. Phys. vol. 37 (Year: 1998).*

* cited by examiner

*Primary Examiner* — Nathaniel T Woodward
(74) *Attorney, Agent, or Firm* — Kacvinsky Daisak Bluni PLLC

(57) ABSTRACT

An Acousto-Optic Gyroscope (AOG) consisting of a photonic integrated device embedded into two inherently matched piezoelectric surface acoustic wave (SAW) resonators sharing the same acoustic cavity is disclosed. The micromachined strain-based AOG uses the effective index of the optical waveguide due to the acousto-optic effect rather than conventional displacement sensing.

23 Claims, 14 Drawing Sheets

ACOUSTO-OPTIC GYROSCOPES

RELATED APPLICATIONS

This application claims the benefit of U.S. Provisional Application No. 62/606,676, filed Oct. 3, 2017.

GOVERNMENT INTEREST

This invention was made with government support under a contract from the Defense Advanced Research Projects Agency (DARPA) entitled Precise Robust Inertial Guide for Munitions (PRIGM)-Advanced Inertial Micro Sensor (AIMS) program (Award No. N66001-16-1-4025). The U. S. Government has certain rights in the invention.

BACKGROUND OF THE INVENTION

Existing gyroscopes for inertial navigation systems are based on either bulky mechanical implementations or large volume and high power Optical Gyroscopes (OGs). MEMS vibratory gyroscopes (MVGs) are an interesting alternative but have exhibited limitations on various fronts. The need for a large released mass makes MVGs vulnerable to shock. Because most MVGs operate at few kHz with quality factors >1,000, their output bandwidth is limited to mHz for frequency matched operation unless complex bandwidth extension techniques are used. Furthermore, the low operation frequency makes the gyroscope susceptible to environmental vibrations. On the other hand, OGs such as Fiber Optic Gyroscope (FOG) and Ring Laser Gyroscope (RLG) can achieve both high performance and operation stability. Unfortunately, miniaturization and power scaling of these implementations are challenging.

SUMMARY OF THE INVENTION

Disclosed herein is an Acousto-Optic Gyroscope (AOG), which has the theoretical capability of addressing all the major issues encountered in MVGs or miniaturized OGs. The AOG is based on the concept of the Surface Acoustic Wave Gyroscope (SAWG), in which the Coriolis force detection is performed optically instead of acousto-electrically. The use of SAW resonators enables the realization of a large unreleased mass and wide bandwidth operation. The optical sensing of the strain induced by the Coriolis force (via the acousto-optic effects) provides for extremely low noise levels, high sensitivity, and stable readout. In addition, the optical detection method significantly simplifies the electronic readout. The Coriolis-induced strain is mapped to a change in the effective index of the optical waveguide through the acousto-optic effect. Different photonic phase sensing techniques can be used to detect the index change such as a Mach-Zehnder Interferometer (MZI) operated in the push pull operation or a racetrack (RT) resonator. Herein is described an implementation of the AOG in a lithium niobate on insulator (LNOI) substrate, which was selected because of its unique acoustic and photonic properties. The Scale Factor, SF, of a gyroscope is defined as the ratio of the output voltage to the input rotation. The derivation of the SF for the AOG and a comparison the two aforementioned phase sensing techniques are shown below. Various embodiments and a method of fabrication are presented. A theoretical analysis verified experimentally is also discussed.

BRIEF DESCRIPTION OF THE DRAWINGS

FIG. 2(a) shows the strained waveguides as part of a PP-MZI and FIG. 2(b) shows the strained waveguides as part of an RT resonator.

DETAILED DESCRIPTION

Figure 1:
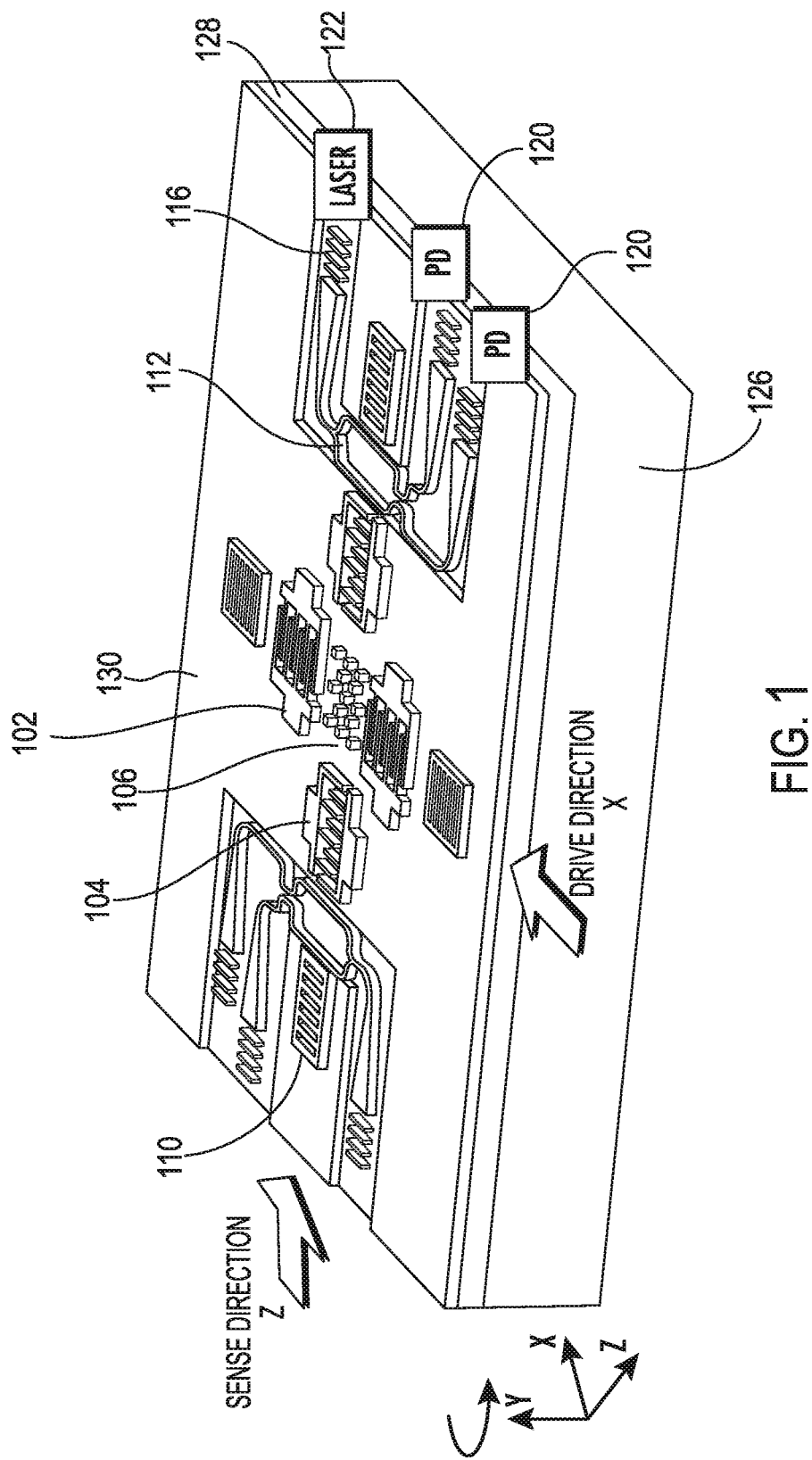
FIG. 1 is a 3D sketch of one embodiment of the AOG.

FIG. 1 depicts a schematic view of the AOG and offers an overview of its principle of operation. Two orthogonal SAW resonators 102, 104, are provided with metallic pillars 106 placed at the center acting as the moving mass, $M_p$, of the gyroscope. A SAW standing wave pattern is established along the drive (X) direction. The pillars 106 are placed inside the cavity at the anti-nodes of the SAW standing wave pattern, that is, at the location of the maximum x-directed velocity. The pillars 106 are driven longitudinally with vibration velocity, $v_p$. When out-plane rotation, $\Omega_z$, is applied, Coriolis force, $F_c$, is induced on the vibrating pillars 106 in the direction orthogonal to both the input rotation direction and the drive vibration direction. The Coriolis force can be expressed as:

$$F_c = -2M_p \Omega_z \times v_p \quad (1)$$

The pillars are arranged in a checkerboard configuration such that their constructive interference establishes a secondary SAW in the sense (Z) direction. For Rayleigh SAW mode, the dominant strain component is the longitudinal one along the propagation direction, S, which can be expressed in terms of the stress, $\sigma$ as $S \approx \sigma/(\rho v_R^2)$ where $\rho = 4700$ kg/m³ (for lithium niobate (LN)) is the substrate mass density and $v_r = 3488$ m/sec is the Rayleigh SAW phase velocity. Because the stress can be directly related to the Coriolis force as $\sigma = F_c/(LH)$ where L is the acousto-optical (AO) interaction length and H is the SAW penetration depth, (which is less than 10% of the acoustic wavelength, $\Lambda$), then the strain, S, can be expressed as:

$$S = \frac{F_c}{\rho v_R^2 LH}$$

In one embodiment, the secondary wave is detected through the elasto-optic effect in the photonic waveguides etched in the Lithium Niobate (LN) thin film, that is, by monitoring the refractive index change, $\Delta n$, due to the strain induced by the secondary wave. The change in the effective index of the optical waveguide is expressed as:

$$\Delta n = \tfrac{1}{2} n^3 p_{eff} S \quad (3)$$

where $p_{eff}$ is the effective acousto-optic coefficient in the specific propagation direction of the SAW.

In an alternate embodiment, the device can be operated as a SAWG with acousto-electrical sensing, wherein the output is sensed through the sense SAW resonator.

FIG. 1 shows one embodiment of the invention wherein the photonic sensing technique using a push-pull MZI (PP-MZI) 112, which converts the phase modulation to intensity modulation at the photodetector output by mixing the optical beams from the two MZI arms. In other embodiments, other phase sensing techniques like AOG RT can also be used, as discussed below.

AOG Scale Factor and Comparison of Photonic Detection Techniques

The SF (or sensitivity) of the AOG is determined by the change in the optical signal intensity, T, due to the phase variation, $\varphi_{AOG}$, $G = \partial T/\partial \varphi_{AOG}$, as a function of the external rotation, $\Omega_z$, $\beta_{AOG} = \partial \varphi_{AOG}/\partial \Omega_z$, which directly relates to the SAW cavity design and the elasto-optic characteristics of the LN film. Overall, the SF can be expressed as:

$$SF = \frac{\partial T}{\partial \Omega_z} = \frac{\partial T}{\partial \varphi_{AOG}} \frac{\partial \varphi_{AOG}}{\partial \Omega_z} = G \beta_{AOG} \quad (4)$$

The induced phase shift due to rotation, $\varphi_{AOG}$, can be expressed in terms of the refractive index change, $\Delta n$, and the waveguide length, L, as:

$$\varphi_{AOG} = \Delta n \frac{2\pi}{\lambda} L$$

where $\lambda = 1550$ nm is the optical wavelength. The SF is written in this way such that a direct comparison between various phase sensing techniques can be formulated by analyzing the gain factor, $$G = \left| \frac{\partial T}{\partial \varphi_{AOG}} \right|_{max}.$$

Rotation-Induced Phase Changes

Placing the waveguides at the location of maximum strain for the standing wave pattern of the SAW cavity enhances the phase sensitivity by the resonator quality factor in the sense direction, $Q_s$. This phenomenon can be accounted for by modifying Eq. (5) to be:

$$\varphi_{AOG} = Q_s \frac{2\pi}{\lambda} L \Delta n$$

The vibration velocity in Eq. (1) can be expressed in terms of the drive parameters: the electrical power, $P_m$, the drive resonator quality factor, $Q_D$, the resonator equivalent mass, $M_r$, and the SAW resonance frequency, $f_m$, as:

$$v_p = \sqrt{\frac{P_m Q_D}{\pi f_m M_r}} \quad (7)$$

Combining Eqs. (1)-(7), the rotation induced phase can thus be derived to be equal to:

$$\beta_{AOG} = \frac{2\pi}{\lambda H} \sqrt{\frac{M_2}{\rho v_R}} M_p \sqrt{\frac{P_m Q_D}{\pi f_m M_r}} Q_S \quad (8)$$

where $M_2 = (n^6 (p_{eff})^2)/(\rho v_R^3)$ is the AO figure of merit of the material.

Photonic Sensing Techniques

FIG. 1 shows the two-phase sensing techniques considered for comparison in this study. FIG. 1(a) represents a PP-MZI where $E_{in}$ represents the input electric field while $E_{o1}$ and $E_{o2}$ represent the output fields from the MMI coupler. For differential operation of the PP-MZI, its normalized transfer function is given by $T_{PP-MZI} = \sin 2\varphi_{AOG}$. The factor of two in the argument of the sin function is due to the push-pull operation enabled by separating the centers of the MZI arms by a distance equal to $3\Lambda/2$. This separation implies opposite phase modulation in the two arms such that when one waveguide is under compression, the other one is under tension. Thus, the AOG SF gain can be derived by evaluating the maximum of $\partial T/\partial \varphi_{AOG}$, which is equal to:

$$G_{PP-MZI} = 2$$

The AOG RT phase sensing technique is shown in FIG. 1(b) where an RT is coupled to a bus waveguide. We assume that only the two straight arms of the RT contribute to the phase modulation. For this reason, the separation between the two straight arms in the RT is set to an even multiple of $\Lambda/2$, such that both waveguides will be either under compression or under tension at the same time. Thus, the transfer function for the RT can be expressed in terms of the round trip intrinsic loss inside the RT, $a^2$, the coupling coefficient, $r^2$, and the round trip total phase shift, $\varphi$, as:

$$T_{RT} = \frac{a^2 + r^2 - 2ar\cos(\varphi)}{1 + a^2r^2 - 2ar\cos(\varphi)}$$

where $\varphi = \varphi_o + 2\varphi_{AOG}$, $$\varphi_o = n\frac{2\pi}{\lambda}L_T$$

is the round trip phase shift, and $L_T$ is the total racetrack length. Thus:

$$\frac{\partial T_{RT}}{\partial \varphi_{AOG}} = \frac{2ar\sin\varphi(1 + a^2r^2 - r^2 - a^2)}{(1 + a^2r^2 - 2ar\cos\varphi)^2} \quad (11)$$

Figure 2:
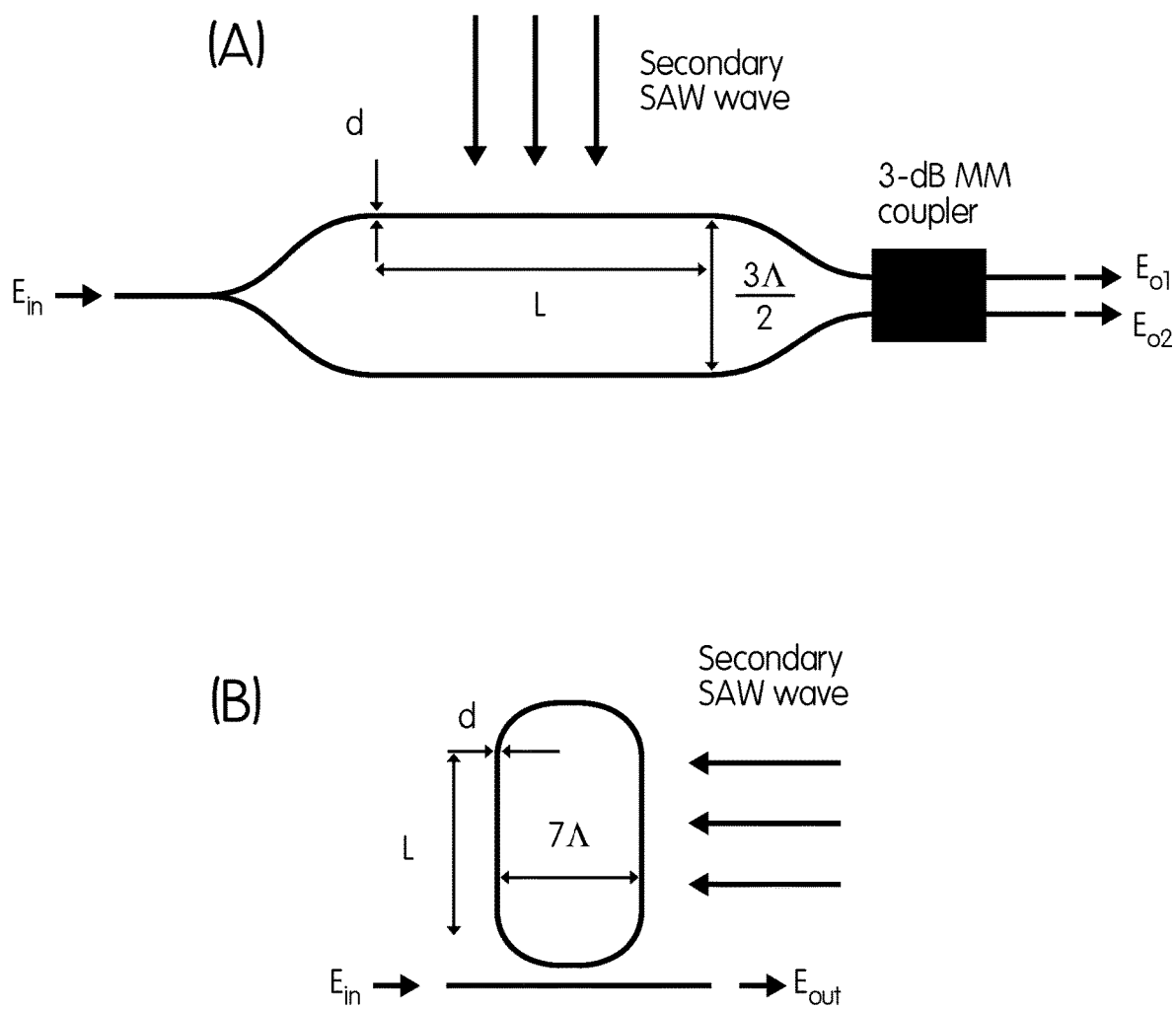
FIG. 2 schematically shows phase sensing techniques for the AOG where the secondary acoustic induced due to rotation is sensed as strain variation in the photonic waveguides.

FIG. 2 plots $T_{RT}$ and its derivative as function of $\varphi_{AOG}$. The finesse, F, can be derived also in terms of a and r as $$F = \frac{\pi\sqrt{ar}}{1 - ar}.$$

Figure 3:
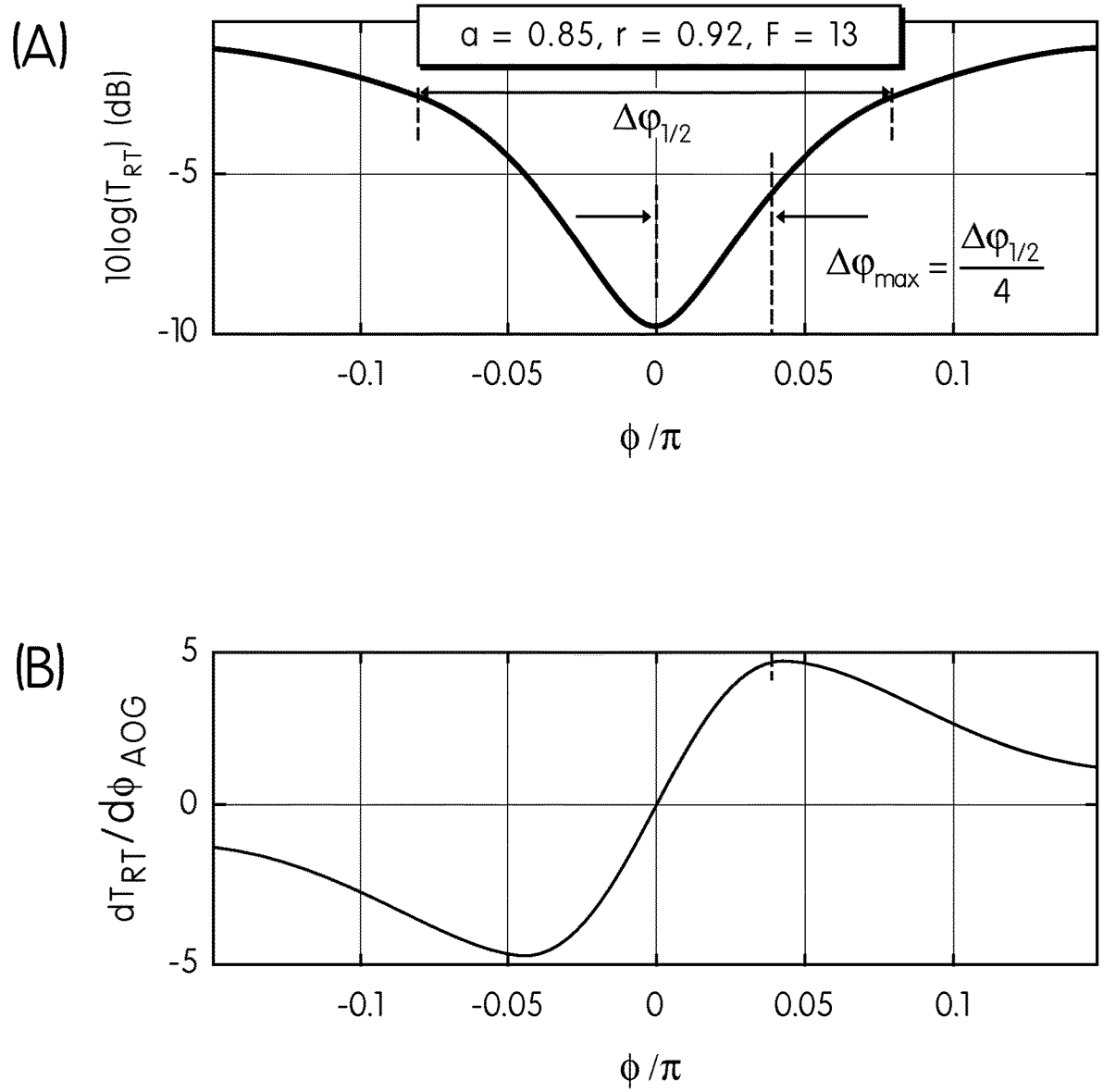
FIG. 3 shows graphs of the RT transfer function and its derivative as function of phase, wherein maximum phase sensitivity is obtained at one quarter of the full width half maximum.

The plot in FIG. 3 assumes a specific value of the cavity finesse, F=13. It is evident that the maximum value of the derivative of $T_{RT}$ is a strong function of a and r.

$$\frac{\partial T_{RT}}{\partial \varphi}$$

has a maximum at a specific phase offset that equals to one quarter of the full width half maximum ($\Delta_{\varphi_{1/2}}$), $\Delta_{100\,max} = \Delta_{\varphi_{1/2}}$ where $\Delta_{\varphi_{1/2}}$ is given in terms of a and r as $$\Delta\varphi_{1/2} = \frac{2(1 - ar)}{\sqrt{ar}}.$$

Accordingly, the maximum AOG sensitivity gain can be derived as:

$$G_{RT} = \left|\frac{\partial T_{RT}}{\partial \varphi_{AOG}}\right|_{\varphi = \Delta\varphi_{1/2}/4}$$

At this specific bias point, and assuming a low loss resonator, we can approximate $\sin\varphi \approx \Delta\varphi_{1/2}/4$ and $$\cos\varphi \approx 1 - \frac{1}{2}\left(\frac{\Delta\varphi_{1/2}}{4}\right)^2$$

in Eq. (11) to get:

$$G_{RT} \approx \frac{2ar\Delta\varphi_{1/2}(1 - a^2)(1 - r^2)}{2\left(1 + a^2r^2 - 2ar + ar\frac{(\Delta\varphi_{1/2})^2}{16}\right)^2} \quad (13)$$

Also, for low loss cavity near critical coupling, we can impose that $a \approx r$ and $$F \approx \frac{\pi r}{1 - r^2} = \frac{2\pi}{\Delta\varphi_{1/2}}$$

so as to find a very simple expression of the RT gain factor:

$$G_{RT} = \frac{32F}{25\pi} \approx \frac{2F}{5} \quad (14)$$

To verify this analytical value, the derivative $\partial_{RT}/\partial\varphi_{AOG}$ is computed numerically using Matlab and plotted in FIG. 3 as a function of r for two values of a=0.85 and a=0.99. The first value a=0.85 represents the round-trip loss extracted from the RT resonator of this work and is equivalent to a propagation loss of 2.5 dB/cm. The second value of a=0.99, corresponds to ultra-low losses (2.5 dB/m) that were recently reported for etched waveguide on the same LNOI substrate. Note that the finesse of the cavity is varying along that curve as r varies and the dashed lines point out the F value at the points of maximum slope. The numerical analysis confirms our analytical conclusion that the gain in the SF is bounded by 2F/5. It also shows that the RT has to be under-coupled for maximum phase sensitivity.

Acousto-Optic Gyroscope Design

Figure 4:
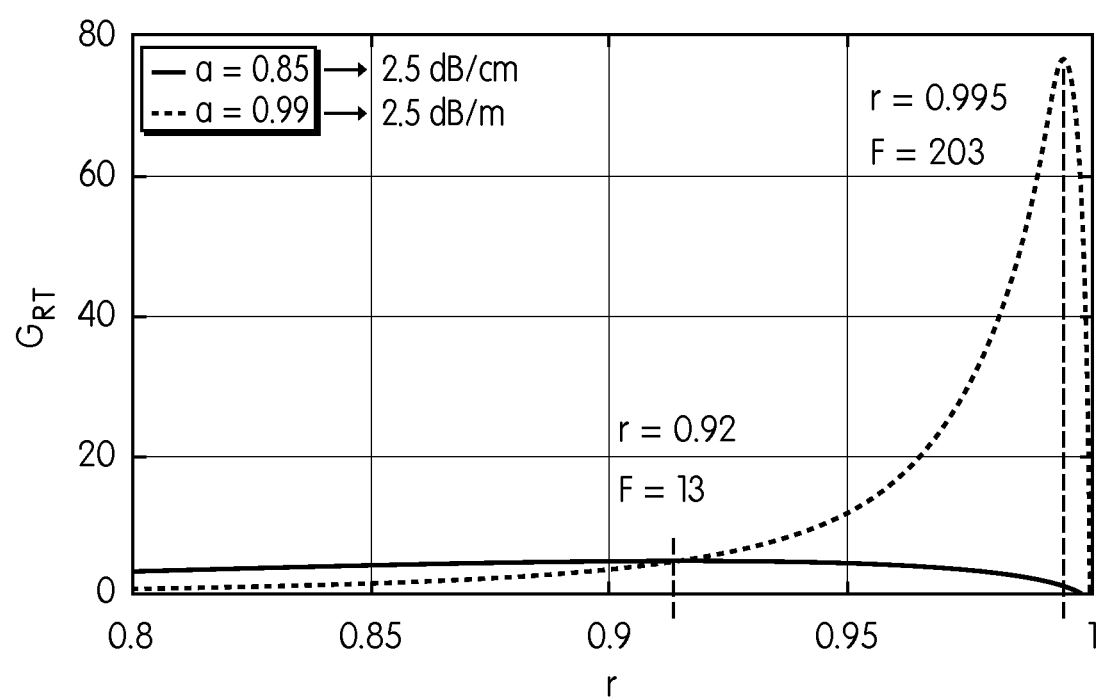
FIG. 4 shows a graph of $G_{RT}$ as function of r for two values of a. The lower the losses, the more sensitive is the RT. Optimum coupling is found at $r=\sqrt{a}$ for maximum phase sensitivity.
Figure 5:
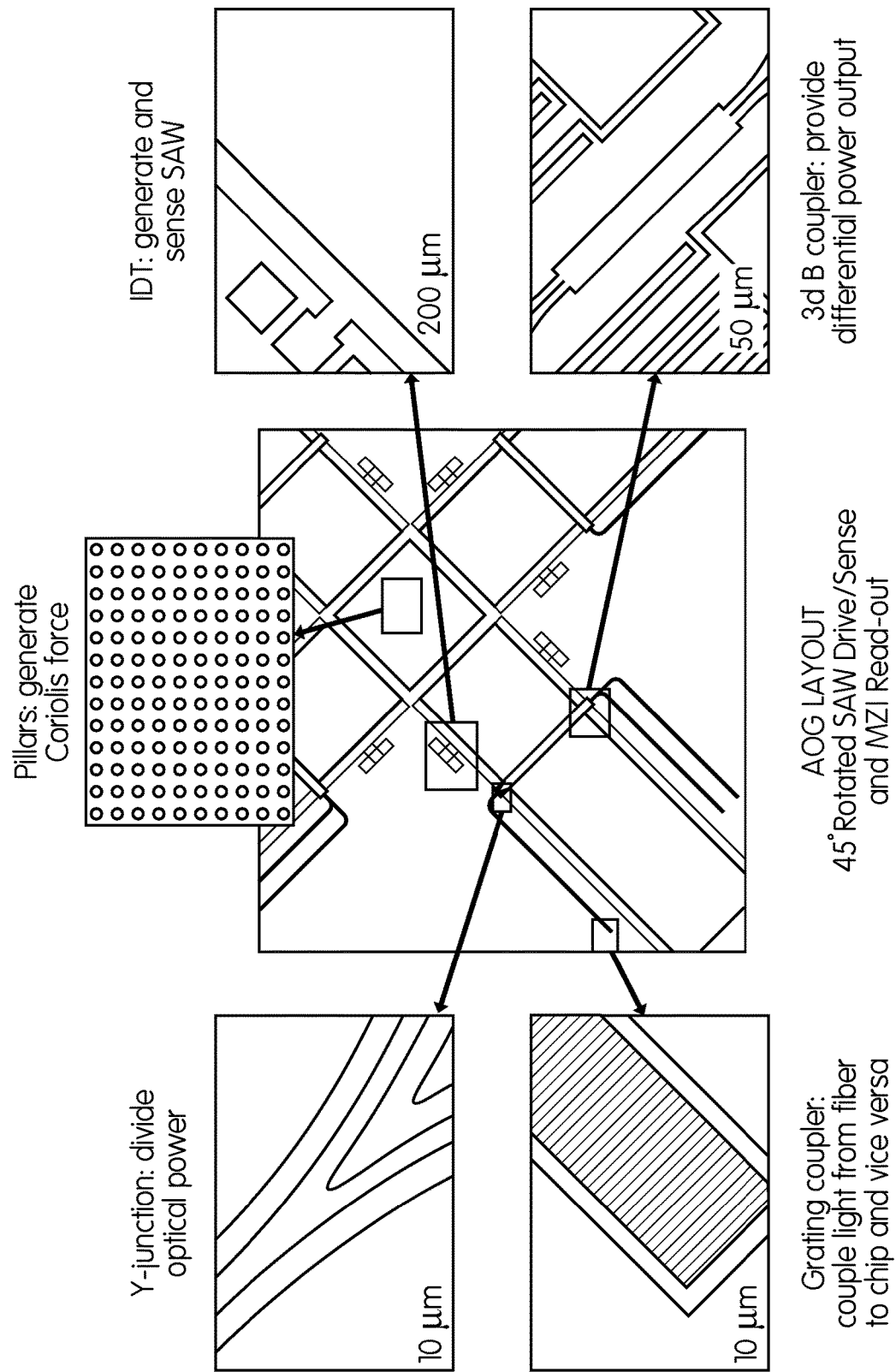
FIG. 5 schematically shows the layout of the MZI AOG with zoomed-in SEMs of the various components forming it.
Figure 6:
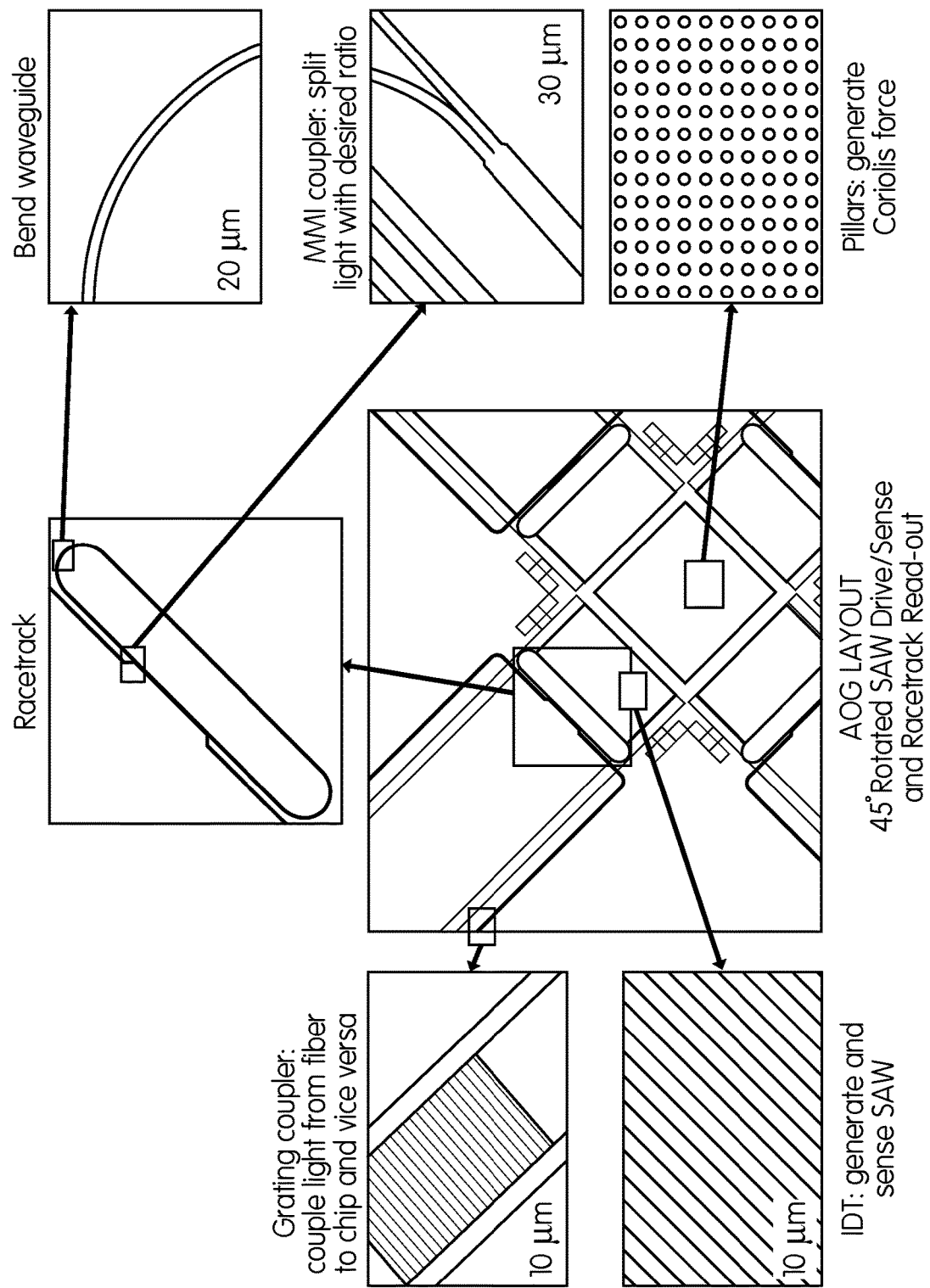
FIG. 6 schematically shows the layout of the RT AOG with zoomed-in SEMs of the various components forming it.

FIG. 4 and FIG. 5 show the layout views for the MZI-AOG and the RT-AOG respectively with zoomed-in SEMs of the various constitutive components. Four identical Inter-digitated Transducers (IDTs), SAW reflectors and photonic waveguides are placed symmetrically with respect to a central pillar-filled cavity such as to ensure frequency matching between orthogonal SAW resonators. The IDTs in the sense direction are not excited electrically so that they have minimum effect on the secondary SAW standing wave pattern. The reason for having IDTs in the sense direction is to make sure that design is fully symmetric, and the frequencies of the drive and sense resonators are able to be matched. The light is coupled in and out using grating couplers 116.

The photonic readout shown in FIG. 4 is based on a (PP-MZI) where a Y junction is used for splitting the optical input into the two arms of the MZI and a 2×2 multimode interference (MMI) 3-dB coupler is used as a beam combiner. The differential output is detected using a balanced photodetector 120. An RT is used in the photonic read-out where a butterfly MMI coupler is used to couple the light to the RT.

SAW Resonator Design

The SAW resonator Q in the drive and sense directions can be fully harnessed when the frequencies of the orthogonal resonators are matched. Previous SAW gyroscope designs targeted SAW propagation direction and LN wafer cuts that provide the highest electromechanical coupling coefficient by driving the SAW in the Z direction for a Y cut LN wafer. However, for such a cut, the material properties in the two orthogonal in-plane directions (X and Z) are not the same due the trigonal crystalline structure of LN. Such a configuration makes frequency matching difficult. In the design of the AOG, the two SAW resonators are rotated by ±45° with respect to the Z-direction to preserve symmetry, hence inherently matching the drive and sense frequencies. The aperture length is equal to the total cavity length and is chosen to be L=40Λ. The acoustic wavelength is selected to be Λ=30 μm so as to fit the gyroscope design in a 20×20 mm² die. This wavelength corresponds to an acoustic frequency of 115 MHz. The SAW reflector has 700 fingers to ensure proper confinement of the SAW inside the cavity.

Frequency matching between the drive direction (X) and the sense direction (Z) can also be attained by separately tuning the center frequencies of each acoustic cavity by modifying the electrical boundary conditions for the acoustic gratings (reflectors) 110. By varying the electrical load attached to the reflectors between open circuit and short circuit conditions a continuous range of frequencies within a few 1,000s parts per million of the resonator center frequencies can be attained.

Photonic Components Design

For both types of AOGs, grating couplers were used to couple light in and out of the photonic components. The grating coupler dimensions shown in FIG. 7(a), were optimized for maximum coupling efficiency for the TE polarized light. $\Delta_g$=1 μm for the period, $\delta/\Delta_g$=0.44 for the duty cycle and e=330 nm for the etch depth, assuming $\theta_m$=8 degrees as the coupling angle were selected.

The length of the waveguides of the MZI arms and the RT straight arm are chosen to be equal to the cavity length. The waveguides are placed at the positions of maximum strain in the SAW cavity. The separation of the MZI is set to 3Λ/2 for push-pull operation while the RT straight arms' separation is set to 7Λ to double the phase sensitivity. The length and width of the 3-dB MMI coupler in the MZI-AOG are chosen to be $L_{3dB-MMI}$=118.1 μm and $W_{3dB-MMI}$=11.6 μm, respectively, as shown in FIG. 7(b), to ensure 3-dB splitting around 1550 nm (optical wavelength). The dimensions of the butterfly MMI coupler in the RT-AOG were chosen to be equal to $W_{1_{BF-MMI}}$=7.6 μm for the outer width, as shown in FIG. 7(c), $W_{2_{BF-MMI}}$=14.5 μm for the inner width and $L_{BF-MMI}$=442.6 μm for the length.

Electrodes can be placed next to the waveguides so as to apply an electric field across it and induce an index of refraction change through the electro-optic effect and tune the wavelength of operation of either the MZI or the RT.

Fabrication Process

Figure 7:
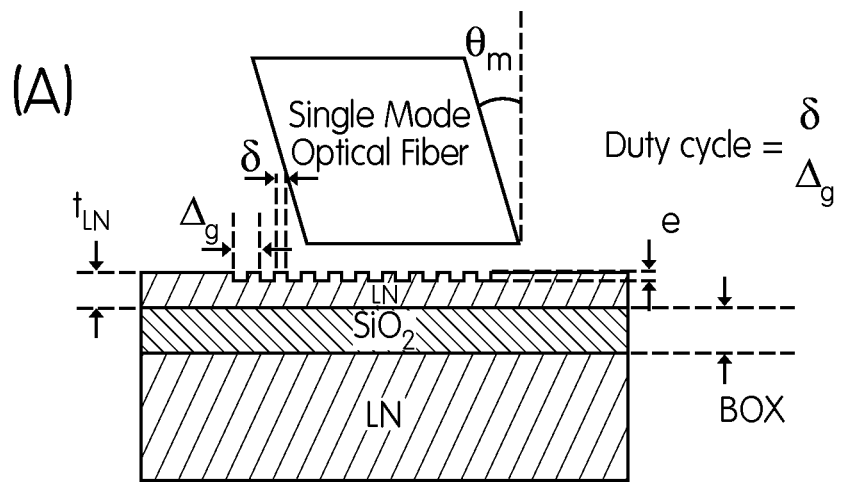
FIG. 7(a) shows the grating coupler design dimensions in one embodiment of the invention.
FIG. 7(b) shows the 3-dB MMI coupler design dimensions in one embodiment of the invention.
FIG. 7(c) shows the butterfly MMI coupler design dimensions in one embodiment of the invention.
Figure 7:
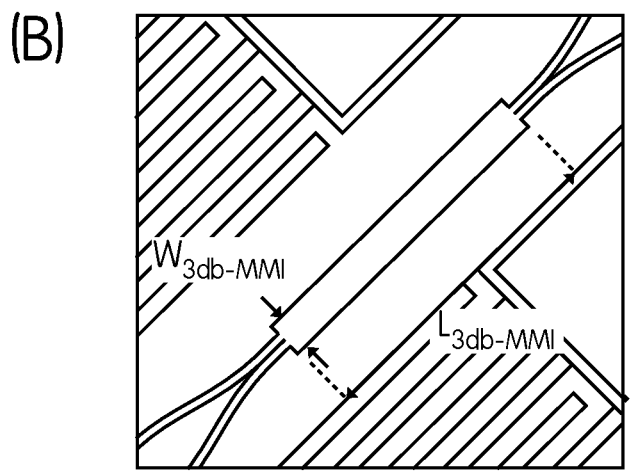
Figure 7:
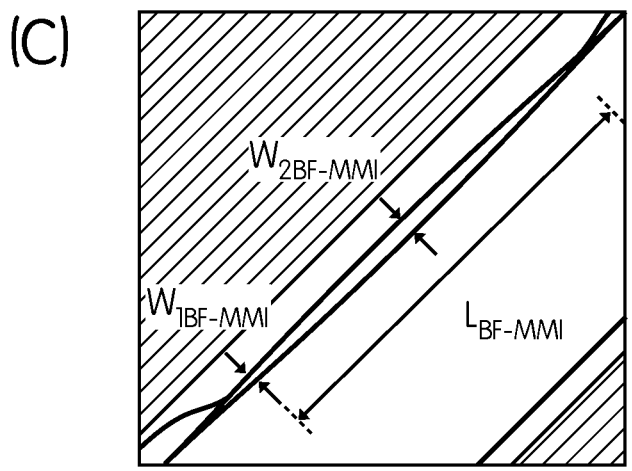

The fabrication process flow is depicted in FIG. 7 starting with a Y-cut LNOI 4" wafer. The LN thin film 130 (3" diameter and 500 nm in thickness) is bonded to silicon dioxide ($SiO_2$, 1 μm thick) 128 on a LN substrate 126. The thin film was formed by means of ion-implantation, slicing and polishing (A) by an external vendor. The first fabrication step consists in the lift-off of evaporated Al thin film, as shown in (B), which is set to be 100 nm thick and is used to define the IDT and reflector electrodes. After this step, a 140 nm Au layer lift-off is performed (C) for patterning of the pillars. Au may also be used for coating the Al pads to facilitate wire bonding for testing purposes. The next step is the deposition of $SiO_2$ (1 μm thick) (D), which is used as a mask layer during the LN etch. Chromium (Cr) (50 nm thick) is then deposited (E) and used as a mask for etching $SiO_2$. This Cr layer is patterned twice. The first pattern is done with optical lithography to define the waveguides (WGs) (F). The second Cr patterning is performed at the die level using electron-beam lithography to define the grating couplers (G). Then $SiO_2$ is etched in a reactive ion etching (RIE) process using fluorine-based chemistry with the double-defined Cr mask (H). Chlorine-based chemistry is used in an inductively coupled plasma (ICP) RIE process to partially etch the LN with the $SiO_2$ mask (I). The Cr mask is also removed during the ICP etch step. The final step is dry etch (J) of $SiO_2$ to expose the metallic pads and completely remove it from the SAW resonator surface.

The novel aspect of the fabrication process is that the transducers, the reflectors and the pillars are all fabricated in the same metallic layer. The metallic material of the layer can be one of a number of materials, such as tungsten (W), gold (Au), aluminum (Al), platinum (Pt), nickel (Ni), molybdenum (Mo), copper (Cu), iridium (Ir), ruthenium (Ru), palladium (Pd), and silver (Ag) or any alloy of the same. Beyond lithium niobate, the SAW components may be composed of GaAs, AlN, Sc-doped AlN, PZT, GaN, ZnO. These materials may comprise the entire wafer or can be a thin film on silicon. The photonic components may be composed of LN, As2S3, GaAs, GaN, AlN, InGaAs, AlGaAs, InP, or any other material which can produce the acousto-optic effect.

Measurement Results

Figure 8:
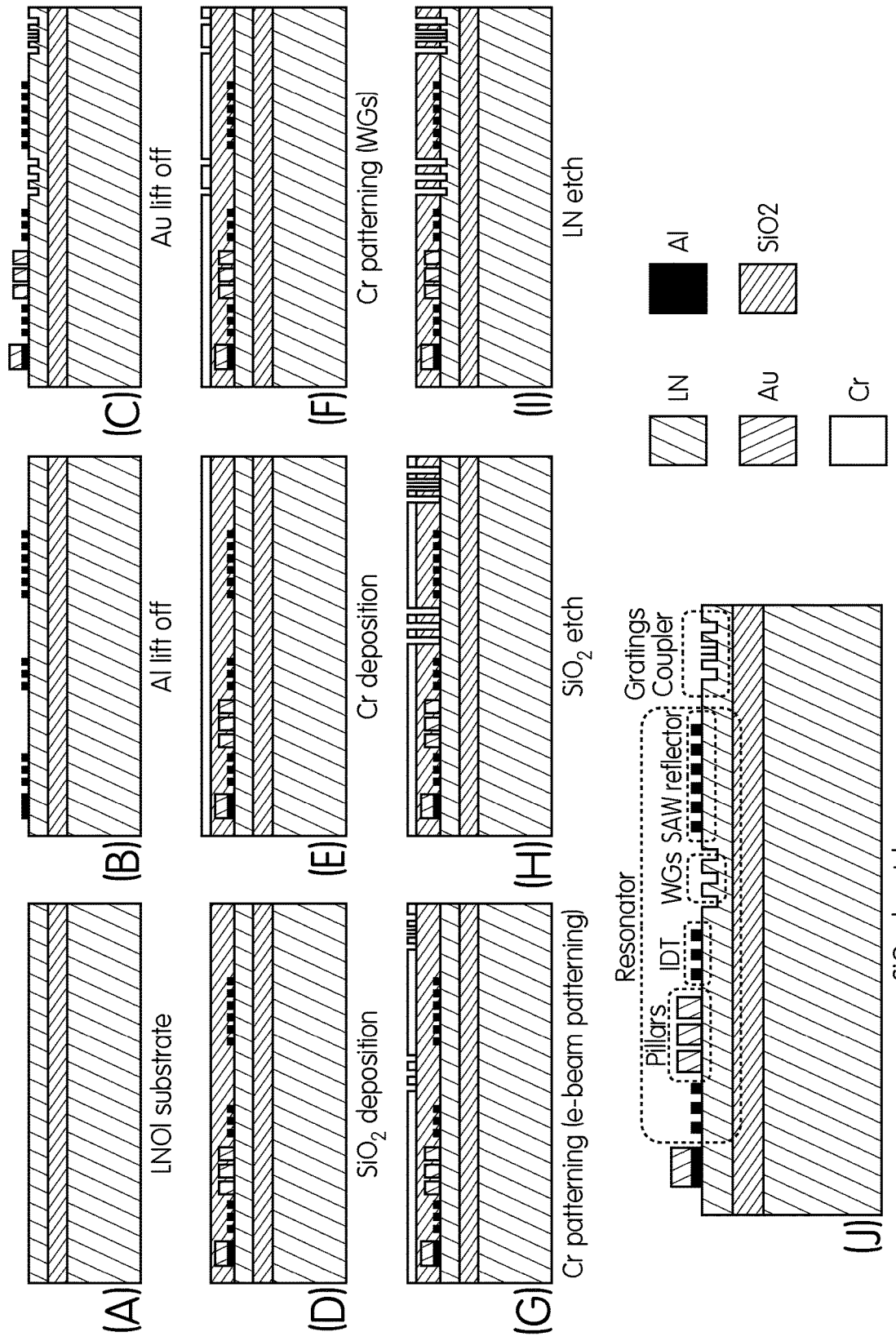
FIG. 8 shows the steps in the fabrication process flow for manufacturing the AOG.

Characterization of SAW Resonators—The frequency responses of the drive and sense acoustic resonators are measured using a vector network analyzer (PNA N5230A) and RF probing. The measurement result showing the magnitude of the cross-coupling admittance, $Y_{21}$, between the two ports of each resonator is reported in FIG. 8. The ~40 kHz mismatch between sense and drive frequencies can be attributed to fabrication misalignments. This mismatch is still within the resonator bandwidth, which is approximately 100 kHz since the loaded $Q_D$=$Q_s$=1000. The quality factor and mismatch can be considered as the limiting aspect for the AOG bandwidth (50 kHz) which is well beyond what can be accomplished by MVGs.

Figure 9:
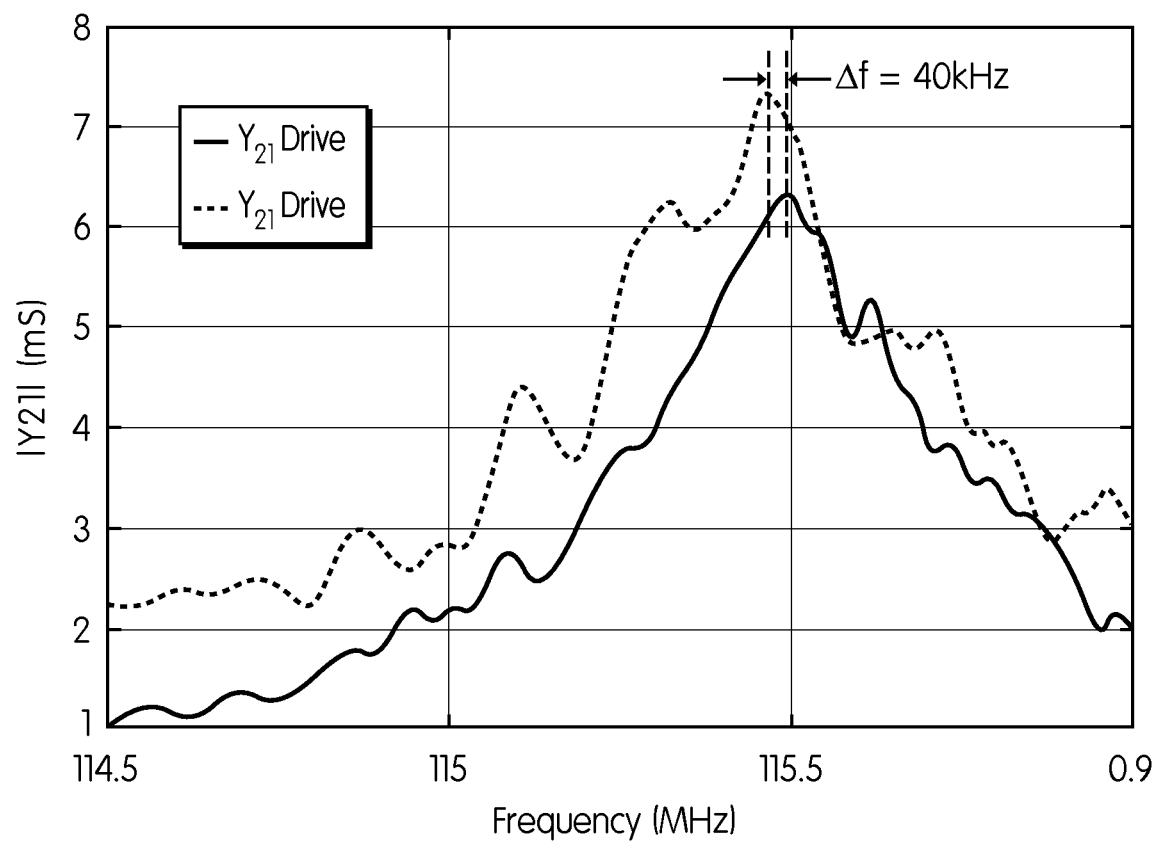
FIG. 9 is a graph of frequency response for the drive and sense cavities showing a mismatch of 40 kHz which is within the resonator bandwidth (100 kHz).
Figure 10:
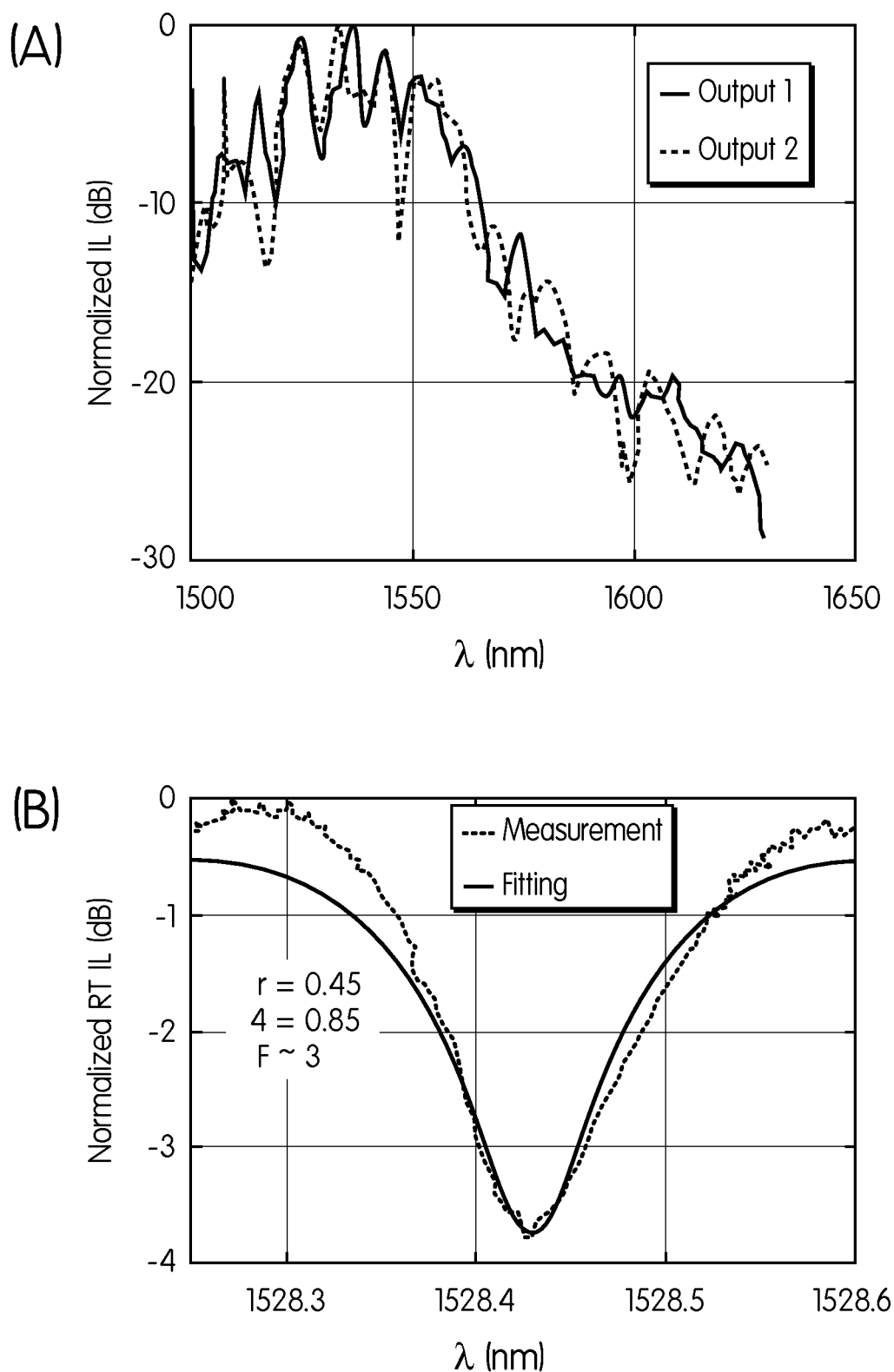
FIG. 10(a) shows a graph of measured insertion loss for the two output ports of the MZI as function of the wavelength.
FIG. 10(b) shows a graph of measured insertion loss for the RT as function of wavelength together with fitting. a, r and F were extracted from the fitting.

Characterization of the Photonic MZI and RT—FIG. 9(a) plots the MZI transfer function for the two outputs as a function of the wavelength. A balanced output is achieved near the design value of 1550 nm.

The slight shift in the wavelength might be attributed to differences in the actual dimensions of the etched waveguides with respect to the design values. The envelope reflects the transfer function of the grating couplers. On the other hand, the RT transfer function with respect to the wavelength is plotted in FIG. 9(b) together with the fitting (to Eq. 10) to extract the round trip loss, a, and the coupling coefficient, r, as well as the Finesse, F. Despite some discrepancies in the fitting of the RT transfer function due mostly to the assumption of having a single mode waveguide (note that the waveguides are 2 μm wide due to fabrication constraints and well above the width required for single-mode operation), it is possible to confidently extract the values of a and r for the fabricated RT. The fiber to chip coupling loss for the MZI was about −35 dB while that for the RT was about −36 dB. The minimum insertion loss for the RT was found at an optical wavelength near 1528 nm, which is different from the design wavelength of the butterfly MMI coupler. The high coupling loss is attributed mostly to the accuracy of the fiber alignment to the photonic chip and to the fabrication tolerance of the gratings couplers dimensions. Prior work on LNOI gratings couplers has demonstrated insertion loss of about 12 dB per coupler. To compensate for such high coupling loss in the AOG measurement, an Erbium Doped Fiber Amplifier (EDFA) is used as described in the next section. Although the butterfly MMI coupler was designed to achieve slightly under-coupling conditions, the extracted value for r at the wavelength of operation is instead reflecting an over-coupling condition (r<a), which ended up impacting the SF negatively.

Figure 11:
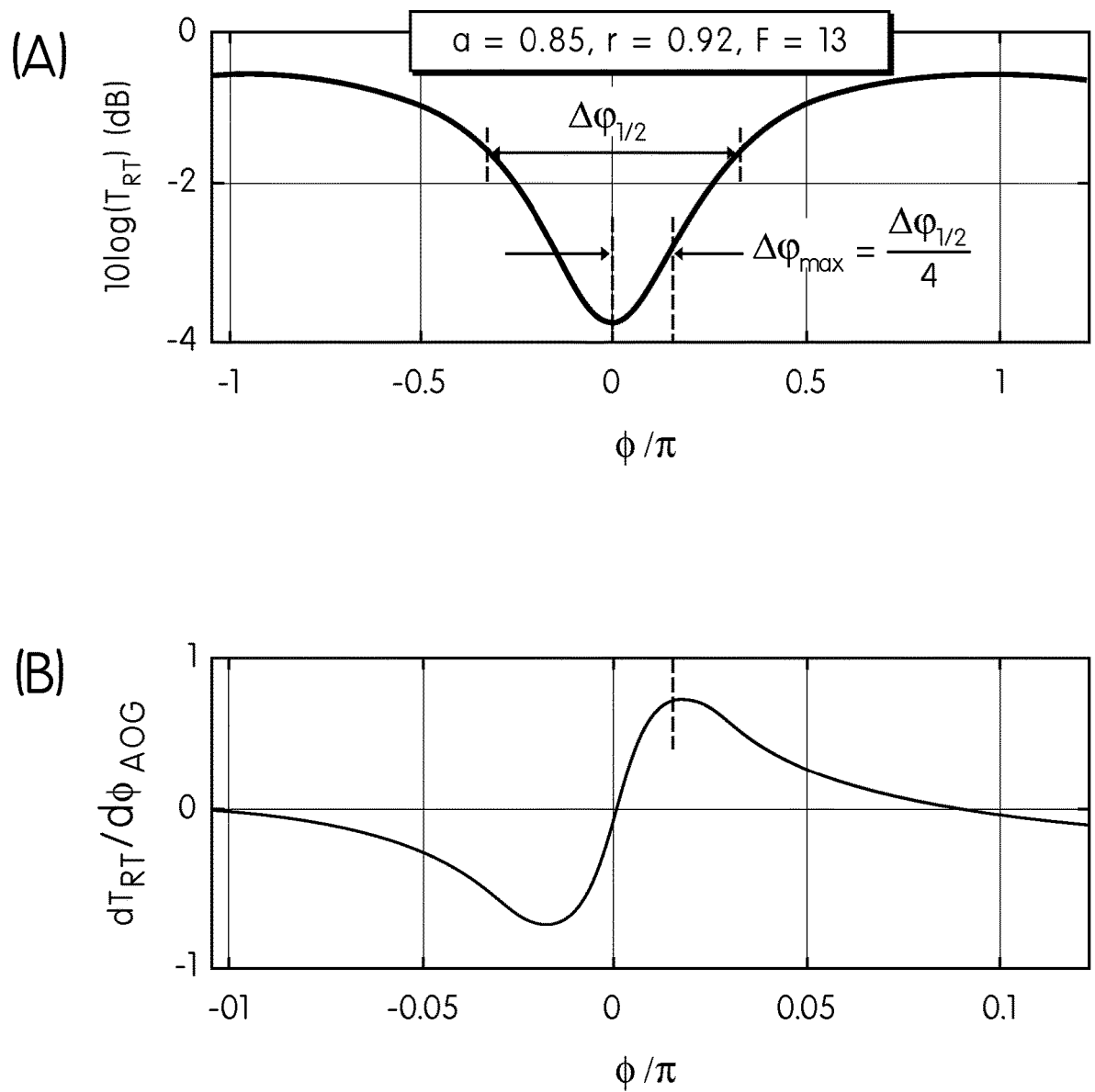
FIG. 11 graphically shows the RT transfer function and its derivative as a function of phase for the actual losses and coupling condition.
Figure 12:
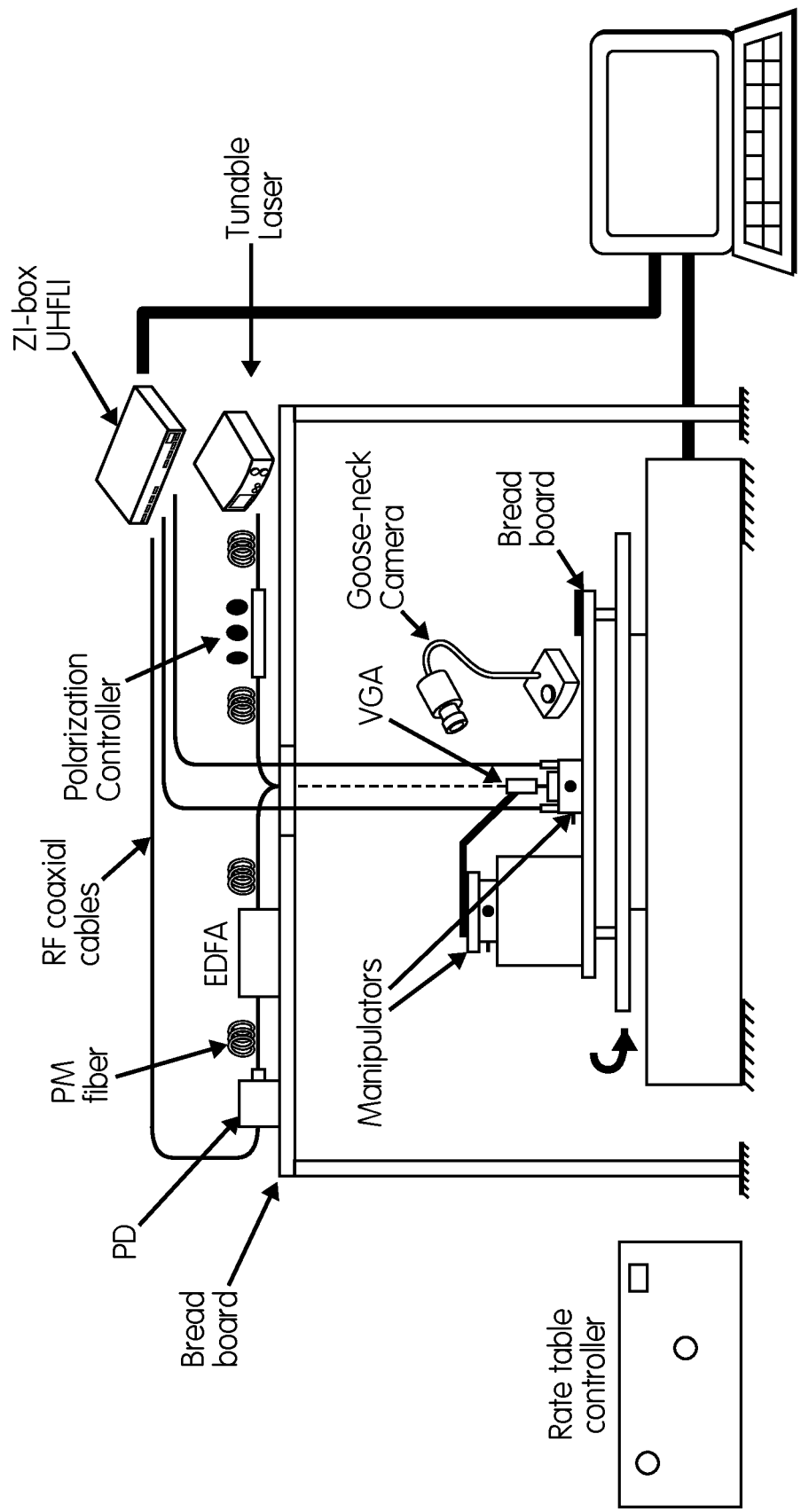
FIG. 12 schematically shows the AOG measurement setup. The optical setup with the positioners and manipulators are mounted on top of the rate table.

FIG. 11 plots the RT transfer function and its derivative for the coupling condition that was achieved experimentally and shows the bias point for maximum sensitivity. Although the attained losses match the one simulated in FIG. 4, it is clear that because of the achieved value of r, the RT configuration is not expected to yield a net enhancement in the sensitivity of the AOG. The plot also shows the bias point at the phase offset of one quarter of the full width half maximum. In terms of wavelength, the bias point can be derived as $$\Delta \lambda_{max} = \frac{\lambda^2}{2\pi n L} \Delta \varphi_{max}.$$

AOG SF Measurement

The AOG measurement setup is shown in FIG. 11 where each of the AOG samples is mounted on a rate table together with the optical positioners and connected to the measurement instruments. The gyroscope die is packaged in a Pin Grid Array (PGA) ceramic package. An Ultra-High Frequency Lock-In (UHFLI) amplifier from Zurich Instruments is used to phase lock the SAW drive resonator using a built-in Phase Locked Loop (PLL). In addition, a built-in Proportional Integral Derivative (PID) controller is used to amplitude-control the drive signal for the SAW resonator and reject any variations due to vibration or temperature drift. An optical carrier generated by a benchtop tunable laser 122 is coupled into the optical grating 116 via a vertical groove array (VGA). A polarization controller is used after the laser 122 to make sure that the TE polarization is excited, for which the gratings couplers were optimized. The same VGA is also used to couple out the modulated gyroscope signal through another set of fibers in the array. The EDFA is placed after the output coupler to compensate for the coupling loss.

The optical alignment is optimized by adjusting a six degree of freedom manipulator while looking for maximum transmission as the if wavelength is being swept. The photonic output is fed to the lock-in amplifier where the Coriolis component is separated from the quadrature component. Due to the RF cables and fibers, full 360° rotations for the rate table are not possible. The input rotation is applied as a sinusoidal oscillation to the rate table. To make sure the optical alignment between the fibers and the gratings couplers does not affect the measurement results, the input rotation frequency is limited to 2 Hz and the amplitude to 8 degrees.

Figure 13:
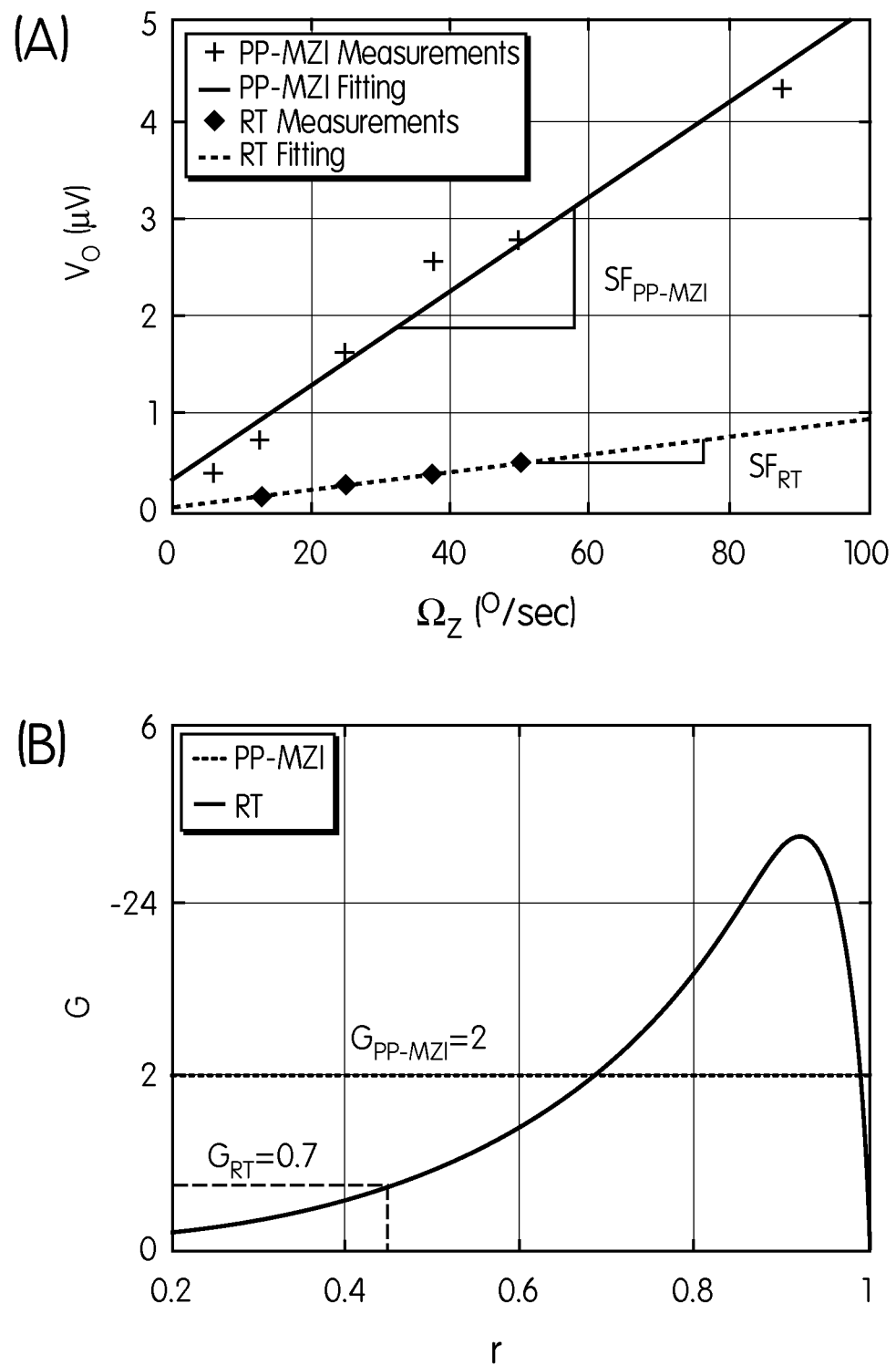
FIG. 13(a) is a graph showing the measured output voltage as a function of rotation rate together with fitting to extract the scale factor for each AOG.
FIG. 13(b) is a graph showing the theoretical comparison between the two photonic sensing techniques. The value of the expected gain factor for the experimentally demonstrated value of r is indicated on the plot.

The SF can be extracted for each AOG as the slope of the straight line in FIG. (a). The measured $SF_{PP-MZI}$=48 nV/(°/sec) in the case of the PP-MZI is higher than that of the RT $SF_{RT}$=9 nV/(°/sec) with the ratio $SF_{PP-MZI}/SF_{RT}$≈5.3. Due to variations in the coupling efficiency, the values of the SF vary from measurement to measurement within ±58% of the average value of 48 nV/(°/sec) and 9 nV/(°/sec) respectively for the PP-MZI and the RT detection methods. The expected theoretical values for the SFs can be obtained directly from Eq. (8), (9) and (14) as $SF_{PP-MZI}$=58 nV/(°/sec) and $SF_{RT}$=20 nV/(°/sec). Because the two SAW resonators behave identically for both AOGs, the theoretically predicted ratio between the two SFs can be calculated as the ratio between the two gain factors, as shown in FIG. 13(b).

$$\frac{SF_{PP-MZI}}{SF_{RT}} = \frac{G_{PP-MZI}}{G_{RT}} = \frac{2}{0.7} = 2.9 \quad (15)$$

The discrepancy between the theoretical prediction and the measured values is attributed mostly to the uncertainty on the repeatability of the coupling. Furthermore, the actual placement of the pillars and fabrication variations have minor impact on that discrepancy. It is important to note that the RT-based detection method yielded a SF lower than the one of the MZI-based method because of the specific losses and the value of r achieved by the RT resonator in this demonstration. In theory, if lower losses and appropriate values of r are attained, then higher gains are possible from the RT-based detection method. These experimental results showcase the first demonstration of an AOG and confirm the validity of our proposed analytical model for the different photonic sensing techniques. The theoretical projections hint that with the appropriate design of the couplers and reduced losses, the AOG sensitivity could be significantly improved, making it a competitive solution beyond MVGs.

AOG ARW Measurement

Figure 14:
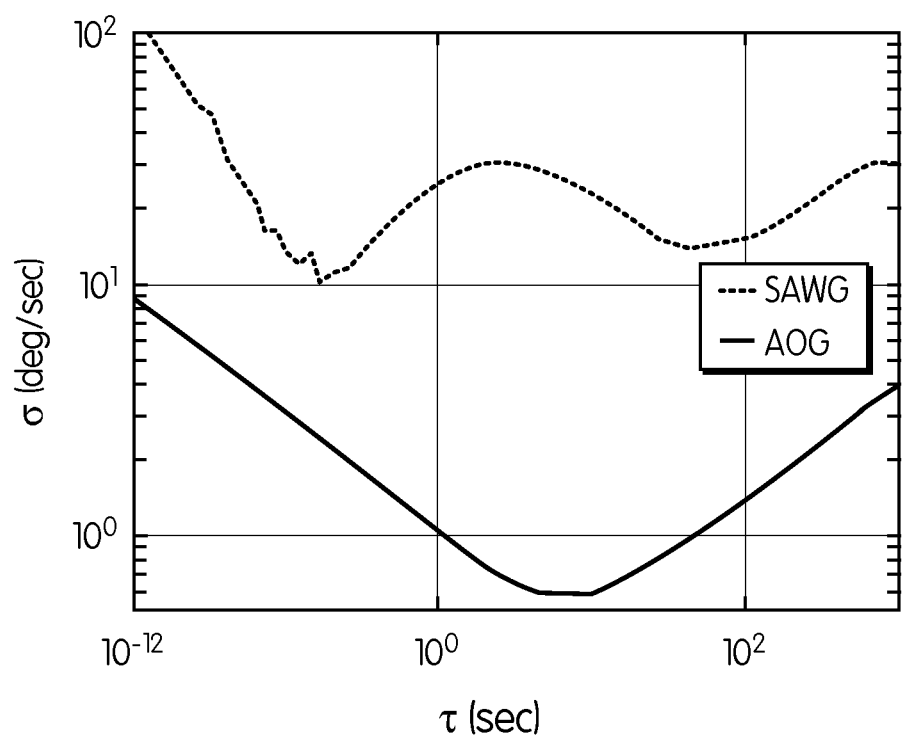
FIG. 14 is a graph showing the measured Allan deviation for the zero-rate output of the AOG compared with the experimental results for the same device tested as a SAWG (electro-acoustic read-out instead of acousto-optic).

The zero-rate output (ZRO) of the MZI-AOG was recorded for 4 hours and its Allan deviation is plotted in FIG. 14 from where ARW of 60°/√hr and bias instability less than 1°/sec can be extracted. FIG. 14 also compares the noise performance of the AOG with the same gyroscope but operated as a SAWG with acousto-electrical sensing (i.e. the output is sensed through the sense SAW resonator). The results highlight the better stability of the AOG due to the decoupling between the acoustic drive signal and the optical sensing signal. Although far from coming close to the best performance MVGs or OGs, this first prototype shows the feasibility of the proposed idea and lays the foundations for further engineering of a high-performance component.

A novel rotation sensing technique based on the acousto-optic effect has been disclosed herein. Two different photonic phase sensing techniques are considered and compared both theoretically and experimentally. The manufacturability of this novel device is made possible by the development of a fabrication process that integrates acoustic and photonic components on the same LNOI platform. The experimental results demonstrate the feasibility of the proposed AOG and, most importantly, verify the theoretical description of its principle of operation.

Despite the limited performance, it can be theoretically shown that the invention could yield more than 20× improvements by reducing the losses on the photonic components and properly designing the MMI coupler. Such improvements yield enhancement of about 20× in the SF and the ARW. Furthermore, additional 20× improvement is possible by increasing the SAW resonators Q and operating at a larger acoustic wavelength. Thus, a new class of highly sensitive strain-based acousto-optic gyroscopes can be developed.

To those skilled in the art to which the invention relates, many modifications and adaptations of the invention will suggest themselves. Implementations provided herein, including sizes, shapes, ratings and specifications of various components or arrangements of components, and descriptions of specific manufacturing processes, should be considered exemplary only and are not meant to limit the invention in any way. As one of skill in the art would realize, many variations on implementations discussed herein which fall within the scope of the invention are possible. Accordingly, the method and apparatus disclosed herein are not to be taken as limitations on the invention but as an illustration thereof.

We claim:

1. A device comprising:
a substrate;
a lithium-niobate wafer or a lithium-niobate wafer on an insulator layer disposed on the substrate;
a drive resonator oriented in a first direction in a drive-sense plane of the lithium-niobate wafer;
a sense resonator oriented in a second direction orthogonal to the first direction in the drive-sense plane of the lithium-niobate wafer; and
a plurality of pillars disposed at the intersection of the drive and sense resonators in the drive-sense plane of the lithium-niobate wafer;
wherein the drive and sense resonators are rotated at an angle in the drive-sense plane with respect to the direction of a cut of the lithium-niobate wafer so that the drive and sense resonators have matching resonant frequencies.

2. The device of claim 1 wherein the drive and sense resonators each comprise:
a first transducer comprising a plurality of interdigitated electrodes and a first reflector arranged longitudinally with respect to the plurality of pillars; and
a second transducer comprising a plurality of interdigitated electrodes and a second reflector arranged longitudinally with respect to the plurality of pillars;
wherein the first and second transducers are adjacent opposite sides of the plurality of pillars.

3. The device of claim 2 wherein an electrical load can be attached to the first and second reflectors to alter a center frequency of the drive and sense resonators.

4. The device of claim 2 wherein the pillars are oriented in a checkerboard configuration.

5. The device of claim 4 wherein the pillars are disposed at the anti-nodes of a standing surface acoustic wave pattern induced by the transducers of the drive resonator.

6. The device of claim 4 wherein the pillars are disposed at the nodes of a standing surface acoustic wave pattern induced by the transducers of the drive resonator.

7. The device of claim 2 wherein the first and second transducers, the first and second reflectors and the plurality of pillars are all fabricated in a single metallic layer.

8. The device of claim 2 further comprising:
one or more photonic sensors, each sensor having two waveguides disposed on the lithium-niobate wafer in the drive-sense plane such as to detect the standing surface acoustic wave induced on the sense resonator.

9. The device of claim 8 wherein the one or more photonic sensors is a Mach-Zehnder Interferometer, having the two waveguides disposed between the first transducer and the first reflector of the sense resonator, the two waveguides separated such that when one waveguide is under compression by the standing surface acoustic wave induced on the sense resonator the other waveguide is under tension.

10. The device of claim 9 further comprising a second Mach-Zehnder Interferometer having the two waveguides disposed between the second transducer and the second reflector of the sense resonator.

11. The device of claim 8 wherein the one or more photonic sensors is an RT resonator having the two waveguides disposed between the first transducer and the first reflector of the sense resonator, the two waveguides separated such that waveguides will either be under compression or under tension at the same time by the standing surface acoustic wave induced on the sense resonator.

12. The device of claim 11 further comprising a second RT resonator having the two waveguides disposed between the second transducer and the second reflector of the sense resonator.

13. The device of claim 8 further comprising:
a first grating coupler for coupling light into the photonic sensor;
a second grating coupler for coupling light out of the one waveguide of the photonic sensor; and
a third grating coupler for coupling light out of the other waveguide of the photonic sensor.

14. The device of claim 8 wherein the drive and sense resonators and the photonic sensor are disposed in a cavity defined by partially etching the lithium niobate wafer.

15. The device of claim 8 wherein the length of the two waveguides of the photonic sensor is equal to the cavity length.

16. The device of claim 8 further comprising a laser source coupled to the input grating coupler of each of the one or more photonic sensors.

17. The device of claim 8 further comprising a first photo detector coupled to the first output grating coupler and a second photo detector coupled to the second output grating coupler of each of the one or more photonic sensors.

18. The device of claim 1 wherein the drive and sense resonators are oriented at a 45 degree angle in the drive-sense plane so as to match the resonant frequencies of the drive and sense resonators.

19. A method using the device of claim 1 wherein an output is sensed directly from the sense resonator.

20. A method using the device of claim 1 comprising:
electrically exciting the drive resonator such as to induce a surface acoustic wave in a drive direction to drive the plurality of pillars with a vibrational velocity to induce longitudinal vibration.

21. The method of claim 20 wherein constructive interference of the plurality of pillars establishes a secondary surface acoustic wave in a sense direction orthogonal to the drive direction in the drive-sense plane when the device is rotated about an axis orthogonal to both the sense direction and the drive direction.

22. The method of claim 20 wherein constructive interference of the plurality of pillars establishes a secondary surface acoustic wave in a sense direction orthogonal to the drive direction in the drive-sense plane when the device is rotated about an axis along the drive direction.

23. The device of claim 1 wherein the drive and sense resonators are identical in geometry and size.

* * * * *